April 23, 1929.  J. W. HOOLEY  1,710,640
OFFSET CONDUIT ELBOW FITTING
Filed April 14, 1928
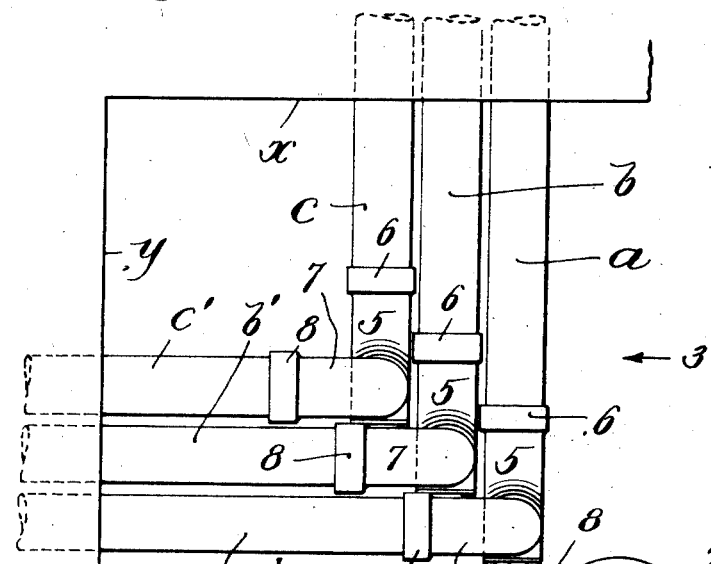
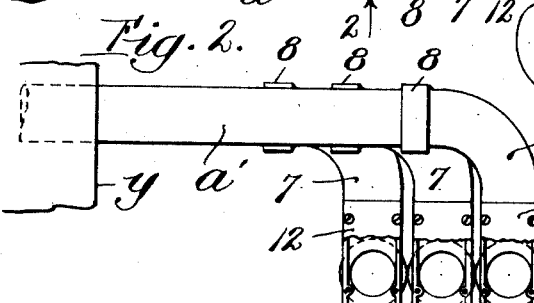
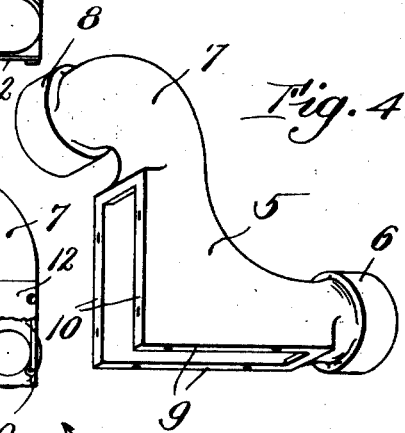
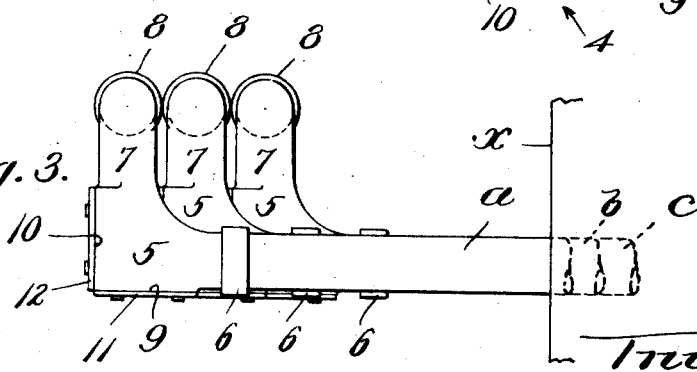
Inventor.
John W. Hooley
by A. W. Harrison
Atty.

Patented Apr. 23, 1929.

1,710,640

UNITED STATES PATENT OFFICE.

JOHN W. HOOLEY, OF LARCHMONT, NEW YORK.

OFFSET CONDUIT-ELBOW FITTING.

Application filed April 14, 1928. Serial No. 270,063.

This invention relates to conduits and the joining thereof, especially when such conduits are to be employed for containing electric cables or wires, and has particular reference to the elbows or junction fittings employed when a series of conduits in close assemblage are installed where access is desirable for the purpose of hauling cables through the conduits, or for effecting splicing.

It is frequently desirable to arrange two series of conduits which approach each other at a more or less acute angle, in a room or the corner of a space; and heretofore, so far as I am aware, such arrangements have resulted in great difficulty in getting convenient access to the elbows employed unless the conduits are widely spaced and consequently occupy an objectionable amount of room.

The object of my invention is to provide a structure which enables angularly related conduits to be mounted or installed close together, even in touching contact, and yet without interfering with convenient access at the elbows for the drawing of cables through either one of them, or interfering with effecting splicing of cables at any elbow. In attaining this object I employ fittings having some of the characteristics of the elbow claimed in my Patent 1,700,983 issued February 5, 1929, and of which the present application is a continuation in part.

With said object in view, my invention consists in the construction and combination of parts substantially as hereinafter described and claimed.

Of the accompanying drawings:

Figure 1 is a plan view of a group of three units embodying my invention.

Figure 2 is a view looking in the direction of the arrow 2, Figure 1, the vertical cover plates being partly broken away and the horizontal plates removed.

Figure 3 is a view looking in the direction of the arrow 3, Figure 1.

Figure 4 is a perspective view of one of the elbows, both of its cover plates being removed.

Similar reference characters indicate similar parts or features in all of the views.

As the structure of all of the conduits and connections are alike, in the embodiment of the invention chosen for illustration, it will facilitate an understanding of the invention to use a series of reference letters for the conduits, although numerals are employed for the elbows or junction fittings.

As many conduits $a$, $b$, $c$, as desired may project from one wall $x$ of a room, all in one horizontal plane and at an elevation to provide space for working below, the conduits $a'$, $b'$, $c'$, extending through another wall $y$ of the room and also all in one horizontal plane although slightly higher than the plane of the series $a$, $b$, $c$. These are closely grouped as illustrated by Figure 1.

The connecting elbows are duplicates of each other, each comprising a body portion 5 having a coupling member 6 at one end to connect with the conduit $a$, $b$, or $c$, and at the other end having a curved lateral extension 7 which terminates in a coupling member 8 to connect with the proper conduit of the other series.

The intermediate portion of the elbow has a continuous opening surrounded by seats 9, 10, for cover plates 11, 12, respectively, as best shown by comparing Figures 3 and 4. Any suitable means are employed for holding the cover plates on the seats, preferably screws.

Either or both of the cover plates may be temporarily removed from either one of the elbows, no matter how many units there are in the group, as all of the elbows and plates are in individually accessible positions as best illustrated by Figure 3.

When the cover plates are removed, cables can be pulled straight through the conduit of either series and coiled or looped outside the elbow and then pulled into and through the other arm of the elbow and the conduit to which it is connected, all without causing any substantial friction with the interior of the elbow. There need not be much or any looping or coiling outside of the elbow as just described, for the cables can be drawn but a short distance in the first direction and then the slack immediately taken up by pulling the portion of the cable which is in the other conduit.

I do not limit myself to the specific angular shape of the elbows as illustrated, nor to any particular means for connecting the elbows to the conduits. Nor do I limit myself to the specific shape or size of the openings and cover plates as illustrated in the drawings. For some purposes, the cover plates might be a single member, but I prefer two. And while the extension 7 of the elbow is illustrated as integral with the body 5, it might be a separate member secured to the body. It is important however, that the portions 7 extend laterally from the plane of the seat 10, so that either elbow, which is in effect a coupling, can connect the pair of conduits $a$, $a'$, or the pair $b$, $b'$, or the pair $c$, $c'$, and permit ready access to either, although the several pairs of angularly mounted conduits are close together.

Having now described my invention, I claim:

1. The combination with a series of conduits mounted in one plane and another series of conduits at an angle thereto and in another plane parallel thereto, of angular tubular couplings connecting the conduits of the two series, said couplings being provided with means for giving access to the interior thereof to permit wires or cables to be drawn in either direction, each coupling having one means of access on the axis of a conduit in one plane, and another means of access on an axis intersecting the axis of the other conduit.

2. The combination with a plurality of pairs of angularly approaching conduits in different parallel planes, of a tubular coupling for each pair, each of said couplings being angular in form and having a laterally curved extension for connection with one conduit of the pair, each of said couplings having one means of access on the axis of a conduit in one plane and another means of access on an axis intersecting the axis of the other conduit, to permit wires or cables to be drawn through the coupling in either direction.

3. A conduit elbow having openings which meet at the angle of the outer face thereof and provided with a laterally curved extension at one end, said extension having its axis intersecting the plane of the elbow, and means for closing said openings.

In testimony whereof I have affixed my signature.

JOHN W. HOOLEY.